3,417,754
OPHTHALMOSCOPES
Desmond Smart, Fossway, Newcastle-upon-Tyne, England, assignor to International Research & Development Company Limited, Newcastle-upon-Tyne, England
Filed July 12, 1965, Ser. No. 470,977
Claims priority, application Great Britain, July 16, 1964, 29,295/64
5 Claims. (Cl. 128—395)

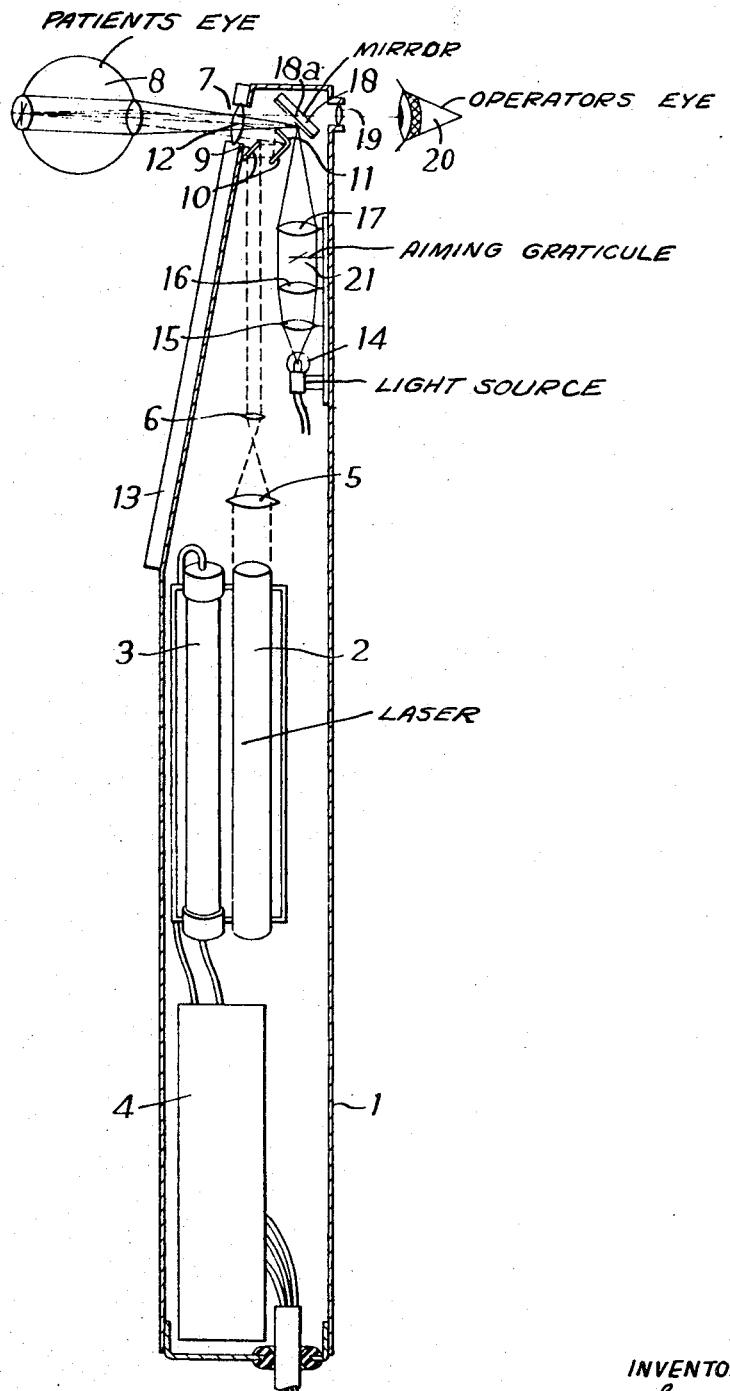

ABSTRACT OF THE DISCLOSURE

An ophthalmoscope incorporating a laser for treatment of the eye wherein in order to prevent the laser beam reaching the eye of the user the optical axis of an observing lens used for visual observation of the eye to be treated is offset at an angle to the optical axis of a focusing lens through which the laser beam and an illuminating beam reach the eye to be treated and through which observation is effected.

---

This invention relates to instruments for the medical treatment of human and animal tissue. It is particularly, though not exclusively, concerned with ophthalmoscopes for the treatment of the eye.

The conventional use of an ophthalmoscope is for inspection of the retina of the eye, but recently ophthalmoscopes have been developed using lasers which can be used not only for inspection but also for treatment of the eye by directing the laser beams onto tissue associated with the eye. In the case of a detached retina, for example, the laser beam can be used to "spot weld" the detached retina on to the wall of the eye.

In accordance with the present invention there is provided an instrument for the treatment of human or animal tissue with a laser beam comprising a laser mounted in a container, means for directing the laser beam through a first aperture in the container on to the tissue to be treated, an optical system for superimposing an illuminating light beam on the laser beam including a graticule to facilitate aiming of the laser beam, and a second aperture in the container aligned with the first for direct visual observation of the tissue to be treated, the second aperture being so positioned that any reflected part of the laser beam cannot fall on the second aperture.

The instrument should preferably have means for mounting a focusing lens in or over the first aperture to enable the laser beam to be focused on the tissue. The second aperture will then be offset with respect to the axis of the focusing lens.

The focusing lens may form part of a rack of different focusing lenses which can be readily moved into the second aperture to give the required focusing distance. If necessary, a further optical system can be introduced to reduce the cross-sectional area of the laser beam.

The light source may be provided by a conventional light source or by a weakened laser beam.

The laser should preferably be a pulsed solid-state laser such as a ruby laser. The directing means for the laser beam and the optical system are so arranged that the laser beam is applied to the area of tissue upon which the aiming point of the graticule is positioned.

The invention will now be described by way of example with reference to the accompanying drawing which is a section through a laser ophthalmoscope in accordance with one embodiment of the invention.

The optical ophthalmoscope comprises a container 1 in which is mounted a ruby rod laser 2 and associated flash tube 3. The flash tube may be a xenon arc flash tube. Connected to the flash tube is a pulse transformer 4 which triggers the main discharge through the flash tube which in turn produces pulses of coherent light from the laser rod 2.

Light from the laser passes through a beam-reducing optical system comprising lenses 5 and 6. These reduce the cross section of the laser beam to the required value for the mirror system 9, 10 and 11 referred to below.

From lens 6 the laser beam passes to optical means for directing it through aperture 7 in the end of the container 1 on to the eye being treated indicated at 8. The optical means comprise mirror 9 and mirrors 10 and 11 at an angle to one another.

From the mirror 11 the laser beam passes to a focusing lens 12 in the aperture 7 which may be such as to correct any defect of the eye and bring laser beam to a focus on the retina. If the eye is normal no special lens is required. The lens 12 preferably forms one of a number of correction lenses mounted on a rack 13 or like device so that the desired lens can readly be moved into aperture 7.

The opthalmoscope also includes an optical system for illuminating the point of application of the laser beam. This system comprises a light source 14 and lenses 15, 16 and 17 which collimate the light and then bring it to a focus on mirror 18. From mirror 18 the light passes through lens 12 and into the eye to provide an illuminated area of light around the laser beam.

The mirror 18 has an aperture 18a opposite an aperture 19 in the wall of container 1 through which the eye 20 of an operator can view the area being treated and the spot focused by the laser beam.

Between lenses 16 and 17 is an aiming graticule 21. The lens system for the light beam is initially adjusted so that when the graticule is located on the area to be treated the laser beam automatically coincides with the aiming part of the graticule when the laser is fired.

The lens 12 is offset in the aperture 7 so that reflections of the laser beam do not pass back through the aperture 19 and damage the eye of the operator.

The laser rod produces pulses of coherent light with a wavelength of 6943 A. for a time of approximately 1 millisecond.

The light source is a filament lamp.

Whilst the invention has been described with reference to its use in an optical ophthalmoscope it can be used for other purposes common with the treatment of human or animal tissue using substantially the same optical system.

I claim:
1. An instrument for the treatment of human or animal tissue with a laser beam comprising:
  a container;
  a laser mounted in said container;
  a first aperture in said container;
  means for mounting a focusing lens in said first aperture;
  means for directing the laser beam through said focusing lens;
  an illuminating light source within said casing;
  an optical system for directing light from said source through said focusing lens to illuminate the tissue, said optical system being independent of said laser beam directing means;
  a graticule incorporated in said optical system to facilitate aiming of the laser beam;
  a second aperture in said casing aligned with said first aperture for direct visual observation of said tissue; and
  an observing lens disposed in said second aperture, the optical axis of said observing lens being offset at an angle to the optical axis of said focusing lens.

2. An instrument as claimed in claim 1, including an optical system to reduce the cross-sectional area of the laser beam.

3. An instrument as claimed in claim 1 in which said optical system includes a mirror, said mirror having a transparent region disposed between the first and second apertures through which visual observation can be effected.

4. An instrument as claimed in claim 1 in which said means for directing the laser beam direct it through said focusing lens at an angle to the optical axis of said focusing lens.

5. An instrument for the treatment of human or animal tissue with a beam of coherent radiation comprising:
- a container;
- a ruby rod laser disposed within said container;
- a flash tube in said container disposed to illuminate said laser;
- a focusing lens mounted on said container to focus the laser beam on the tissue;
- a mirror system within said container for directing the beam from said laser through said focusing lens;
- an illuminating optical system within said container for directing a light beam through said focusing lens to illuminate the tissue;
- a graticule to facilitate aiming of the laser beam, said graticule forming part of said optical system;
- and an observing lens in an aperture in the container opposite said focusing lens for direct visual observation of the tissue, the optical axis of said observing lens being disposed at an angle to that of said focusing lens such that no reflected part of the laser beam can enter the eye of the user.

References Cited

UNITED STATES PATENTS

| | | | |
|---|---|---|---|
| 3,348,547 | 10/1967 | Kavanaugh | 128—395 |
| 2,930,379 | 3/1960 | Dopp et al. | 128—396 |
| 3,084,694 | 4/1963 | Kavanaugh et al. | 128—396 |
| 3,096,767 | 7/1963 | Gresser et al. | 128—395 |
| 3,315,680 | 4/1967 | Silbertrust et al. | 128—395 |

RICHARD A. GAUDET, *Primary Examiner.*

WILLIAM E. KAMM, *Assitsant Examiner.*

U.S. Cl. X.R.

128—76.5